United States Patent
He

(10) Patent No.: US 7,587,009 B2
(45) Date of Patent: Sep. 8, 2009

(54) SYNCHRONIZATION AND ESTIMATION OF A TRANSMISSION CHANNEL

(75) Inventor: Shousheng He, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 717 days.

(21) Appl. No.: 10/534,916

(22) PCT Filed: Oct. 31, 2003

(86) PCT No.: PCT/EP03/12202

§ 371 (c)(1),
(2), (4) Date: Sep. 28, 2005

(87) PCT Pub. No.: WO2004/047389

PCT Pub. Date: Jun. 3, 2004

(65) Prior Publication Data

US 2006/0125817 A1  Jun. 15, 2006

Related U.S. Application Data

(60) Provisional application No. 60/429,680, filed on Nov. 26, 2002.

(30) Foreign Application Priority Data

Nov. 20, 2002  (EP) .................................. 02388072

(51) Int. Cl.
*H04B 1/10* (2006.01)
(52) U.S. Cl. ..................................................... 375/350
(58) Field of Classification Search ................. 375/229, 375/230, 232, 260, 340, 342–343, 350; 370/503, 370/509, 514
See application file for complete search history.

(56) References Cited

U.S. PATENT DOCUMENTS

| | | | | |
|---|---|---|---|---|
| 6,711,124 B2 * | 3/2004 | Khayrallah et al. | ......... | 370/208 |
| 6,876,675 B1 * | 4/2005 | Jones et al. | ................. | 370/509 |
| 7,127,014 B2 * | 10/2006 | Li et al. | ...................... | 375/349 |
| 2002/0181407 A1 * | 12/2002 | Khullar et al. | .............. | 370/252 |

FOREIGN PATENT DOCUMENTS

| | | |
|---|---|---|
| WO | WO 02/43271 | 5/2002 |
| WO | WO 02/082711 | 10/2002 |
| WO | WO 02/103972 | 12/2002 |

OTHER PUBLICATIONS

Rolf Johansson; "System Modeling and Identification"; Department of Automatic Control Lund Institute of Technology, Prentice Hall, Englewood Cliffs, NJ 07632; pp. 200-207.

* cited by examiner

*Primary Examiner*—Khanh C Tran
(74) *Attorney, Agent, or Firm*—Michael Cameron

(57) ABSTRACT

A method of estimating a transmission channel (302) comprises receiving a signal burst, which includes a sequence of training symbols; and determining (305) a desired synchronization position (p) of the training sequence with respect to the received signal burst. The method further comprises determining estimates of the transmission channel as a function of the synchronization position (p) and a size of the equalizer window (m); and determining the desired synchronization position and the size of the equalizer window by calculating an error measure based on the received signal burst and the determined estimates for selected values of the synchronization position and of the size of the equalizer window, where the values of the size of the equalizer window are selected between predetermined upper ($m_u$) and lower ($m_l$) bounds.

15 Claims, 4 Drawing Sheets

SYNCHRONIZATION AND ESTIMATION OF A TRANSMISSION CHANNEL

This patent application claims the benefit of priority from U.S. Provisional Patent Application Ser. No. 60/429,680 filed on Nov. 26, 2002. This application incorporates by reference the entire disclosure of U.S. Provisional Patent Application Ser. No. 60/429,680.

The present invention relates generally to the field of digital communications; and, more particularly, to an efficient channel estimation method and arrangement for a digital communications system, such as a GSM/EDGE digital communications system, which provides a joint optimization of synchronization and equalizer window sizing.

In a digital communications system, such as TDMA1, GSM, EDGE, or the like, data is encoded into symbols, packed into bursts and modulated prior to transmission via a physical transmission channel. At the receiver, the demodulation is performed by an equalizer which compensates for channel distortions, e.g. due to Inter-symbol interference (ISI).

Inter-symbol interference (ISI) is an important problem in digital communications systems, including those systems which operate in accordance with the Global System for Mobile Communications (GSM) specifications. ISI is caused by time dispersion in the transmission channel over which a signal is transmitted, and adversely affects the quality of the received signal. In effect, ISI causes distortion of the transmitted signal which, in turn, causes symbol errors in the received signal such that it becomes difficult for the receiver to determine what data was actually sent.

As is well-known in the art, the usual way to compensate for ISI in a GSM system is to provide a channel estimation-based equalizer in the receiver. Basically, a model or estimate of the propagation channel over which a received signal was transmitted is created; and the equalizer then uses that information to estimate the sending symbols that best fit the received signal.

Correct burst synchronization and channel estimation, including estimation of the channel delay spread, are essential for the performance of the equalizer and other baseband processing. Burst synchronization and channel estimation utilize the knowledge of a training sequence of symbols which is sent as part of the bursts, e.g. as a mid-ample in a burst.

EDGE (Enhanced Data rates for Global Evolution) is an interface mode which has recently been developed for GSM Networks. EDGE's principal features include new modulation and coding schemes which increase data capacity and speed in the air interface. EDGE is fully based on GSM and uses the same TDMA (Time Division Multiple Access) frame structure as GSM, such that it allows GSM operators to use existing GSM radio bands to offer wireless multimedia-based services and applications.

In GSM/EDGE systems, the performance of the equalizer in combating ISI depends heavily on the quality of the channel estimation; and the quality of the channel estimation is, in turn, highly sensitive to the accuracy of burst synchronization (the term "synchronization" in this document signifies "burst synchronization") and the size of the equalizer window.

To effectively combat ISI, the size of the equalizer window must be large enough to cover the maximum delay spread of the channel. However, an over-sized equalizer window will result in performance losses in channels with shorter delay spread due to inaccurate channel estimation, inadequate synchronization and increased noise contribution. The size of the equalizer window may be expressed as the number of filter taps of a corresponding equalizer filter. In the following, the size of the equalizer window will also be referred to as equalizer span or window span of the equalizer. In addition, synchronization can be optimized only with the knowledge of the equalizer window to capture maximum energy in the window span. In general, the interdependency of synchronization and equalizer window sizing makes efficient optimization difficult to achieve under different channel conditions. Joint optimization was deemed as too expensive in practical implementation.

Because of this interdependency, a careful compromise has to be made for a traditional equalizer with fixed window span so that the size of the window can provide adequate performance in long delay spread channels, such as Hilly Terrain (HT), without losing too much in short delay spread channels, such as Typical Urban (TU).

When the equalizer window size is set, there are two approaches for burst synchronization, a correlation-based approach and a least square error (LSE) approach. As will be described more fully hereinafter, in current GSM receivers, synchronization is done by a correlation-based approach in which the central 16 symbols of a known 26-symbol training sequence is correlated with the central 16 symbols of the training sequence in the received signal.

The synchronization is determined by either the center of gravity of the correlation or the maximum correlation energy in the equalizer window. In the LSE approach, for each possible synchronization point, an estimation of the channel is made, and synchronization is determined by comparing the expected and received training sequence via a least square error criterion.

Neither of these approaches, however, is fully satisfactory. The correlation-based algorithm suffers from performance degradation due to inaccurate synchronization, especially in long dispersive channels, while a straightforward LSE-based algorithm suffers from a high degree of computational complexity (mainly due to multiple channel estimation).

In particular, when non-white interferences, e.g. co-channel and adjacent-channel interferences as in GSM/EDGE systems, exist or when device related distortions exist, such as a DC off-set in homodyne receivers, correlation based algorithms suffer significant performance degradation.

The above and other problems are solved by a method of estimating a transmission channel in a digital communications system including a receiver for receiving signal bursts of a communications signal via the transmission channel, the receiver comprising a channel estimation-based equalizer having an equalizer window, the method comprising receiving a signal burst of the communications signal over the transmission channel, the signal burst including a sequence of training symbols;

determining a desired synchronization position of the sequence of training symbols with respect to the received signal burst.

The method is characterized in that the step of determining a desired synchronization position further comprises determining a number of estimates of the transmission channel as a function of the synchronization position and a size of the equalizer window;

determining a desired synchronization position and a desired size of the equalizer window by calculating an error measure based on the received signal burst and the determined estimates for a number of selected values of the synchronization position and of the size of the equalizer window, where the values of the size of the equalizer window are selected between predetermined upper and lower bounds.

Hence, as the desired synchronization position and the desired size of the equalizer window are determined based on a comparison of the received signal burst with a number of determined estimates for different values of the synchronization position and the size of the equalizer window, a joint optimization of synchronization and equalizer span is achieved and, thus, an improved performance of the equalizer for numerous channel conditions.

By selecting the values of the size of the equalizer window between predetermined upper and lower bounds an interval for the span adaptation is defined, thereby limiting the necessary calculation steps. In the following, this interval will also be referred to as an aperture for the span adaptation.

Preferably, the predetermined upper and lower bounds define an interval having a width which is less than four channel taps, preferably less than three channel taps. Hence, the optimization of the equalizer span is limited to a narrow interval, thereby reducing the required computational resources.

It has been realized that the physical channel in a digital communications system does not change instantly with respect to the delay spread in contrast to, for example, the strength and phase of a signal which may experience rapid fluctuations. Based on this understanding, the aperture of the equalizer span can be made adaptive, i.e. the aperture for a current span optimization may be determined based on the determined equalizer spans for one or more previous bursts.

In a preferred embodiment of the invention, the method further comprises determining the upper and lower bounds based on at least a desired size of the equalizer window as determined for a previously received signal burst. Consequently, the values of the size of the equalizer window are selected in a floating aperture with adaptively determined upper and lower bounds. Hence, the aperture for the span adaptation is made adaptive, and the predetermined upper and lower bounds are determined adaptively.

Preferably, the adaptive determination of the floating aperture for the equalizer window further comprises filtering the values of the equalizer window sizes of previously received signal bursts.

In a further preferred embodiment, the step of determining the upper and lower bounds further comprises
- determining a reference window size by means of an auto regressive filter which is updated for at least a subset of received bursts based on the determined desired size of the equalizer window for each of at least the subset of received bursts; and
- selecting the upper and lower bounds to define an interval having a predetermined width around the determined reference window size.

Hence, the interval position is determined by a filtered version of the determined equalizer span, e.g. at predetermined time intervals such as for every received burst or at least for a subset of received bursts. The width of the interval may be limited to define a narrow aperture, e.g. 2-3 channel taps wide, in order to further reduce the computational effort.

It is an advantage of the invention that it provides a joint optimization of synchronization and equalizer span that only requires little computational resources.

It is a further advantage of the invention that it suppresses abrupt bursts-to-burst changes in the determined size of the equalizer window. Consequently, the effect of so-called "bad samples" in the channel estimation based approach is effectively reduced, thereby enhancing the robustness of the joint optimization against colored interferences and device distortions.

The error measure may be a suitable measure comparing the received signal width an estimated signal as a function of the window size and the synchronization position. For example, the error measure may comprise the estimated noise power calculated based on the received signal and the estimated signal. Correspondingly, the step of determining the desired synchronization position and the desired size of the equalizer window size may comprise a Least Square Error optimization of the error measure.

In a preferred embodiment of the invention, the step of determining a desired synchronization position and a desired size of the equalizer window comprises calculating a difference between a calculated signal power of the received signal and a scaled power of a set of channel taps of the estimate of the transmission channel.

Consequently, an efficient calculation of the error function is provided which allows a calculation of the noise power without the need for calculating the noise signal.

In yet another preferred embodiment of the invention, the method further comprises scaling the calculated difference with a penalty factor penalizing large equalizer windows.

Preferably, the penalty factor comprises an exponential function of the equalizer span with a base determined by a length of the training sequence.

Hence, it is an advantage of the invention that it reduces the risk of overfitting to noise when optimizing the equalizer span and synchronization position.

Preferably, the communications signal comprises a signal in accordance with the GSM specifications or in accordance with the EDGE specifications.

The present invention provides a more efficient channel estimation method by recognizing and utilizing two previously unexploited properties of GSM/EDGE training sequences which arise from the cyclic prefix structure of the training sequences. In particular, the present invention recognizes that the 26-symbol GSM/EDGE training sequences are, within certain ranges, both shift invariant and order invariant. The property of being shift invariant enables a channel estimation to be carried out with delayed (shifted) training sequence segments. This, in turn, permits: I. The ISI corrupted leading training sequence symbols to be avoided as much as possible in long dispersive channels; and II. The leading taps of a channel to be estimated using the same training sequence segments, regardless of the size of the equalizer window. The property of being order invariant permits channels with different time dispersion, from 1-8 symbols (as complex polynomials of 1-8th order) to be estimated without matrix inversion if any consecutive 16-symbol segment of the training sequence is used.

Hence, in a preferred embodiment, the step of determining a number of estimates of the transmission channel comprises selecting a subset of the number of training symbols. This results in a significant reduction in computational complexity in channel estimation for varying window size which can be adaptive to the actual delay spread of the channel.

Furthermore, combining these two properties, a two-dimensional recursive relation can be established for different synchronization points and tap positions.

In a preferred embodiment, the step of determining a number of estimates of the transmission channel comprises determining channel taps of the estimate of the transmission channel for different synchronization positions and different sizes of the equalizer window by a two-dimensional recursive computation step.

Consequently, the present invention provides a practical LSE joint optimization of synchronization and equalizer window sizing.

It is a problem of the above prior art method that in channels with strong interferences a performance loss due to synchronization errors is more significant for the equalizer in a mobile receiver. Due to the limited length of the training sequences e.g. in GSM system, reliable synchronization is difficult to obtain.

Hence, according to yet another preferred embodiment of the invention, the step of determining a desired synchronization position and a desired size of the equalizer window by calculating an error measure based on the received signal burst and the determined estimates for a number of selected values of the synchronization position and of the size of the equalizer window further comprises selecting the values of the size of the synchronization position between predetermined upper and lower bounds; and the method further comprises determining the upper and lower bounds for selecting the values of the size of the synchronization position based on at least a desired synchronization position determined for a previously received signal burst.

Consequently, by using a narrow synchronization window centred around a reference synchronization position, synchronization is improved significantly, since fewer error-prone trials are necessary. The location of this narrow window is set with the information from synchronization positions of a previous burst, and thus "floats" depending on, e.g. the physical location of the mobile terminal. Hence, the candidate values of synchronization positions are selected in a floating aperture of adaptively determined upper and lower bounds.

In a further preferred embodiment of the invention, the step of determining the upper and lower bounds for selecting the values of the size of the synchronization position further comprises determining a reference synchronization position by means of an auto regressive filter which is updated for at least a subset of received bursts based on the determined desired synchronization position for each of at least the subset of received bursts; and selecting the upper and lower bounds for selecting the values of the size of the synchronization position to define an interval having a predetermined width around the determined reference synchronization position.

Hence, the adaptive determination of the floating aperture for the burst synchronization position further comprises filtering the values of the synchronization position of previously received signal bursts. Consequently, a simple and robust method of providing a floating reference position is provided.

In general, the present invention provides an efficient channel estimation for GSM/EDGE systems which, beside direct utilization, is fundamentally important to achieving a practical implementation of joint LSE synchronization and equalizer window sizing.

The present invention can be implemented in different ways including the method described above and in the following, an arrangement, and further methods and product means, each yielding one or more of the benefits and advantages described in connection with the first-mentioned method, and each having one or more preferred embodiments corresponding to the preferred embodiments described in connection with the first-mentioned method and disclosed in the dependant claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

The invention further relates to an arrangement for estimating a transmission channel in a digital communications system including a receiver for receiving signal bursts of a communications signal via the transmission channel, the receiver comprising a channel estimation-based equalizer having an equalizer window, the arrangement comprising means for receiving a signal burst of the communications signal over the transmission channel, the signal burst including a sequence of training symbols;

means for determining a desired synchronization position of the sequence of training symbols with respect to the received signal burst;

characterized in that the means for determining a desired synchronization position is adapted to determine a number of estimates of the transmission channel as a function of the synchronization position and a size of the equalizer window; and to determine a desired synchronization position and a desired size of the equalizer window by calculating an error measure based on the received signal burst and the determined estimates for a number of selected values of the synchronization position and of the size of the equalizer window, where the values of the size of the equalizer window are selected between predetermined upper and lower bounds.

Hence, preferably, the arrangement further comprises means for determining said predetermined upper and lower bounds.

The term means for receiving a signal burst includes any device or circuitry suitable for receiving signal bursts of the communications scheme used in the digital communications system.

The terms means for determining the desired synchronization position and means for determining said predetermined upper and lower bounds comprise any suitable processing means, where the term processing means includes a microprocessor, an application-specific integrated circuit, or another integrated circuit, a smart card, a general purpose computer adapted by suitable software, or the like.

The invention further relates to a receiver for receiving signal bursts of a communications signal via a transmission channel in a digital communications system, the receiver comprising a channel estimation-based equalizer having an equalizer window and an arrangement for estimating the transmission channel, the arrangement comprising means for receiving a signal burst of the communications signal over the transmission channel, the signal burst including a sequence of training symbols;

means for determining a desired synchronization position of the sequence of training symbols with respect to the received signal burst;

characterized in that the means for determining a desired synchronization position is adapted to determine a number of estimates of the transmission channel as a function of the synchronization position and a size of the equalizer window; and to determine a desired synchronization position and a desired size of the equalizer window by calculating an error measure based on the received signal burst and the determined estimates for a number of selected values of the synchronization position and of the size of the equalizer window, where the values of the size of the equalizer window are selected between predetermined upper and lower bounds.

A receiver according to the invention may be part of an electronic equipment where the term electronic equipment includes all stationary and portable radio communication equipment and other handheld or portable devices. The term portable radio communication equipment includes all equipment such as mobile telephones, pagers, communicators, i.e. electronic organisers, smart phones, personal digital assistants (PDAs), handheld computers, or the like.

It is a problem of the above prior art method that in channels with strong interferences a performance loss due to synchronization errors is more significant for the equalizer in a mobile receiver. Due to the limited length of the training sequences e.g. in GSM system, reliable synchronization is difficult to obtain.

Hence, according to another aspect of the invention, the above and other problems are solved when a method of estimating a transmission channel in a digital communications system including a receiver for receiving signal bursts of a communications signal via the transmission channel, the receiver comprising a channel estimation-based equalizer having an equalizer window, the method comprising receiving a signal burst of the communications signal over the transmission channel, the signal burst including a sequence of training symbols;

determining a desired synchronization position of the sequence of training symbols with respect to the received signal burst from a number of estimates of the transmission channel corresponding to a number of selected values of the synchronization position is characterized in that the step of determining a desired synchronization position further comprises determining an upper and a lower bound for the synchronization position based on at least a desired synchronization position determined for a previously received signal burst; and selecting the number of selected values of the synchronization position between the determined upper and lower bounds for the synchronization position.

Consequently, by using a narrow synchronization window centred around a reference synchronization position, synchronization is improved significantly, since fewer error-prone trials are necessary. The location of this narrow window is set with the information from synchronization positions of a previous burst, and thus "floats" depending on, e.g. the physical location of the mobile terminal.

In a preferred embodiment of the invention, the step of determining an upper and a lower bound for the synchronization position further comprises determining a reference synchronization position by means of an auto regressive filter which is updated for at least a subset of received bursts based on the determined desired synchronization position for each of at least the subset of received bursts; and selecting the upper and lower bounds for selecting the values of the size of the synchronization position to define an interval having a predetermined width around the determined reference synchronization position.

Hence, a simple and robust method of providing a floating reference position is provided.

Further preferred embodiments and the corresponding advantages correspond to the preferred embodiments of the first-mentioned method and their corresponding advantages.

The invention further relates to an arrangement for estimating a transmission channel in a digital communications system including a receiver for receiving signal bursts of a communications signal via the transmission channel, the receiver comprising a channel estimation-based equalizer having an equalizer window, the arrangement comprising means for receiving a signal burst of the communications signal over the transmission channel, the signal burst including a sequence of training symbols;

means for determining a desired synchronization position of the sequence of training symbols with respect to the received signal burst from a number of estimates of the transmission channel corresponding to a number of selected values of the synchronization position;

characterized in that the means for determining a desired synchronization position is further adapted to determine an upper and a lower bound for the synchronization position based on at least a desired synchronization position determined for a previously received signal burst; and to select the number of selected values of the synchronization position between the determined upper and lower bounds for the synchronization position.

The invention further relates to a receiver for receiving signal bursts of a communications signal via a transmission channel in a digital communications system, the receiver comprising a channel estimation-based equalizer having an equalizer window and an arrangement for estimating the transmission channel, the arrangement comprising means for receiving a signal burst of the communications signal over the transmission channel, the signal burst including a sequence of training symbols;

means for determining a desired synchronization position of the sequence of training symbols with respect to the received signal burst from a number of estimates of the transmission channel corresponding to a number of selected values of the synchronization position;

characterized in that the means for determining a desired synchronization position is further adapted to determine an upper and a lower bound for the synchronization position based on at least a desired synchronization position determined for a previously received signal burst; and to select the number of selected values of the synchronization position between the determined upper and lower bounds for the synchronization position.

The above and further aspects of the invention will be described in more detail in connection with a preferred embodiment and with reference to the drawing in which FIG. 1 schematically illustrates the structure of a TDMA frame used in a digital communications system according to the GSM/EDGE standard;

FIG. 2 schematically illustrates the task of burst synchronization in a digital communications system;

Figure 1:
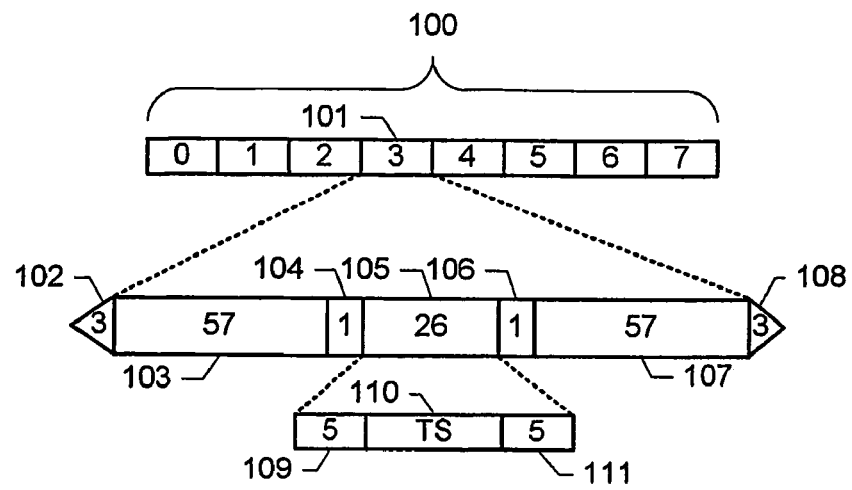

FIG. 1 schematically illustrates the structure of a TDMA frame 100 used in a mobile telecommunications system according to the GSM standard. Frame 100 has a duration of 4.615 ms and accommodates 8 information channels (time slots) 101, designated 0-7 in FIG. 1. Each of the 8 time slots has a duration of 0.577 ms and contains a 148-bit signal portion and a guard portion (not shown) which functions to maintain separation between signals in adjacent time slots. The 148-bit signal portion is generally referred to as a normal burst and comprises a first 3-bit tail bit section 102, a first 57-bit coded data section 103, a first 1-bit housekeeping bit section 104, a 26-bit trailing sequence section 105, a second 1-bit housekeeping bit section 106, a second 57-bit coded data section 167 and a second 3-bit tail bit section 108. The 26-bits comprising the training sequence section 105 in a GSM digital communications system, is typically viewed as being divided into a centrally located portion 110 of 16-bits (sometimes referred to as the mid-amble portion), and side portions 109 and 111 of 5-bits each. Alternatively, in a GSM/EDGE digital communications system, the 26-bit training sequence 105 can be also viewed as including a 16-bit white sequence and a 10-bit cyclic prefix.

It is noted that, alternatively, other burst structures providing a suitable sequence of training symbols may be used.

As mentioned previously, inter-symbol interference can occur in digital communications systems as a result of time dispersion in the transmission channel over which a signal is transmitted. In GSM/EDGE systems, the usual way to compensate for ISI is to provide a channel estimation based equalizer in the receiver. A correct burst synchronization is essential to the performance of the equalizer.

Figure 2:
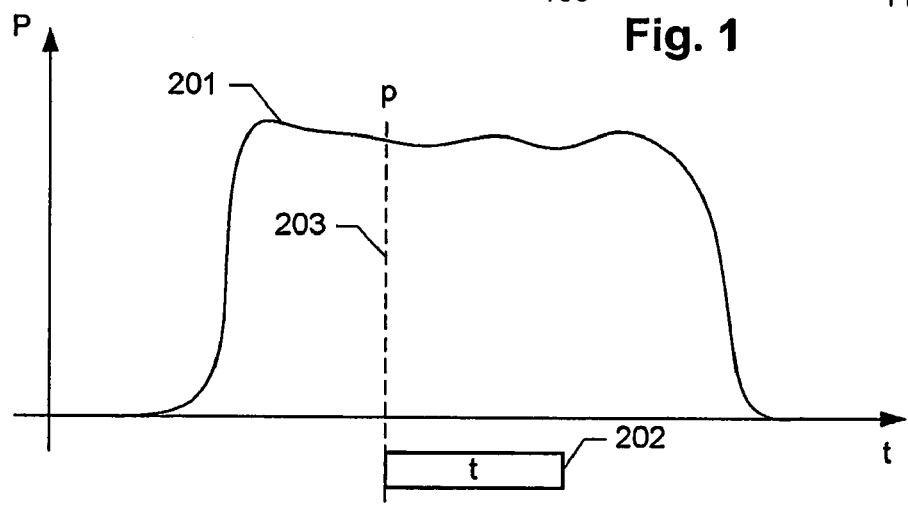

FIG. 2 schematically illustrates the task of burst synchronization in a digital communications system. FIG. 2 shows a schematic example of a received burst 201 which is shown as the received power as a function of time. The shape of the burst is the result of the transmitted burst and the distortions introduced by the transmission channel, such as noise, multipath propagation, etc. The task of burst synchronization involves the task of determining a suitable position p (203) of the training sequence 202 within the received burst.

As mentioned above, in known receivers, the equalizer window size m is set to a predetermined value and burst synchronization is performed by a correlation-based approach. By correlating the known training sequence t (202) with the received signal r (201), for all possible positions k within a synchronization window w, the following correlation coefficients may be calculated $$c(k) = \sum_{i=m}^{n-1} r(i+k) \cdot t(i), \quad k = 0, 1, \ldots, w-1.$$

Here, the correlation length n is determined by the length of the training sequence 202. For GSM/EDGE, for example, the equalizer window size is often set to m=5 and the 16-symbol mid-ample in a 26-symbol training sequence is frequently used, i.e. n=21. With this approach, synchronization may be achieved by a maximum tap energy approach, i.e. the synchronization position p may be determined as $$p = \underset{k}{\mathrm{argmax}} \left( \sum_{i=0}^{m-1} |c(k+i)|^2 \right).$$

Another approach utilizes a center of gravity condition, according to $$p = \frac{\sum_{i=0}^{w-1} i \cdot |c(i)|^2}{\sum_{i=0}^{w-1} |c(i)|^2} - \frac{m}{2}.$$

In an alternative approach, burst synchronization may be achieved by a Least-Squares Error (LSE) method. This approach requires an initial channel estimation $h_p$ for each possible synchronization position p. The desired synchronization position is then determined by minimizing a square error according to $$p = \mathrm{argmin}\left( \sum_k |r(k) - \hat{r}_p(k)|^2 \right), \quad (0)$$

where $$\hat{r}_p(k) = \sum_{i=0}^{m-1} h_p(m-1-i) \cdot t(k+1)$$

is an estimate of the received symbol based on the initial channel estimate $h_p$.

However, neither of these approaches is fully satisfactory. The correlation-based algorithm suffers from performance degradation due to inaccurate synchronization, especially in long dispersive channels, while a straightforward LSE-based algorithm suffers from a high degree of computational complexity (mainly due to multiple channel estimation).

In particular, when non-white interferences, e.g. co-channel and adjacent-channel interferences as in GSM/EDGE systems, exist or when device related distortions exist, such as a DC off-set in homodyne receivers, correlation based algorithms suffer significant performance degradation.

Further, when the channel delay spread is different from the assumed value, considerable performance losses may result, not only because an inadequate span degrades the equalizer performance, but also because an inadequate synchronization may occur.

Figure 3:
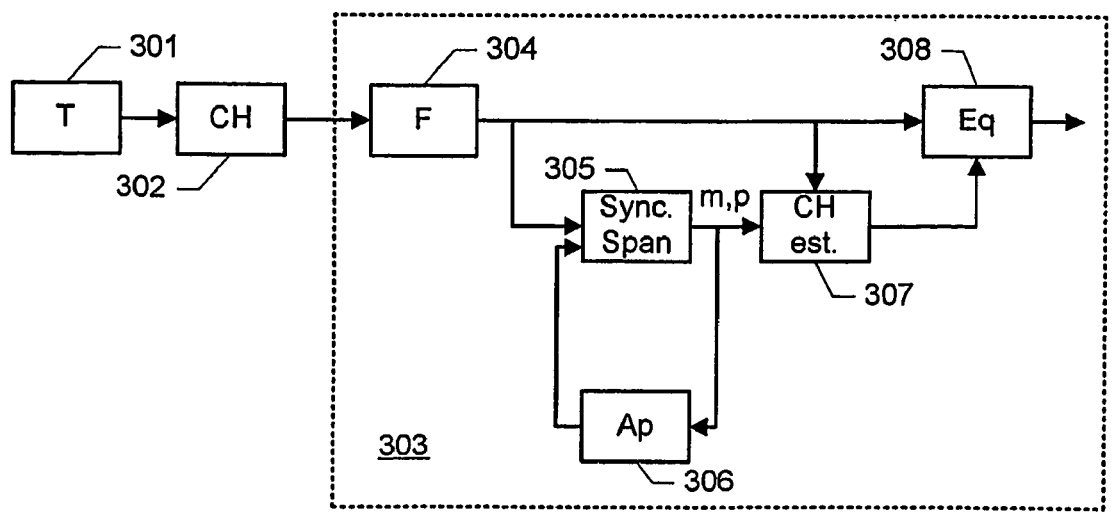
FIG. 3 is a schematic block diagram of a communications system according to an embodiment of the invention.

FIG. 3 is a schematic block diagram of a communications system according to an embodiment of the invention. The communications system comprises a transmitter 301 and a receiver 303. A signal is transmitted from the transmitter 301 to the receiver 303 over a transmission channel 302. The transmission characteristics of the transmission channel frequently change due to a variety of factors, including the motion of the mobile terminals, the fluctuation of multi-path (time dispersive) propagation channels and variant interferences introducing noise. As is well-known to those skilled in the art, the multipath channel and the noise component can adversely affect the quality of the received signal, e.g., cause intersymbol interference; and this necessitates that the received signal be corrected, typically by means of channel estimation-based equalizer.

Specifically, as shown in FIG. 3, at the receiver 303, the received signal, which includes the transmitted signal with intersymbol interference and noise, is, after being filtered by a filter 304, sent to an equalizer 308 which attempts to correct the received signal utilizing an estimate of the transmission channel. The equalizer 308 generates data representing an estimate of the actual transmitted symbols for further processing by the receiver. The receiver 303 further comprises a channel estimation nodule 307 for generating a channel estimate which is fed into the equalizer 308. The channel estimate, in turn, receives a burst synchronization position p and a window size m of the equalizer window as an input.

According to the invention, the receiver 303 comprises a joint synchronization and span adaptation module 305 which performs a joint determination of a synchronization position p and a size m of the equalizer window to be fed into the channel estimation module 307.

The joint optimization of the equalizer span and the synchronization position performs an optimization within a predetermined interval of window sizes. Accordingly, the receiver 303 further comprises an aperture module 306 which determines an upper and a lower bound $m_u$ and $m_l$, respectively, of the window size to be used in the optimization step for the subsequent burst. The aperture module 306 receives the determined window size m for a current burst from the span adaptation module 305 and feeds resulting bounds for the next burst back to the span adaptation module 305. In a preferred embodiment, the aperture module 306 further determines an upper and a lower bound $p_u$ and $p_l$, respectively, of the synchronization position to be used in the optimization step for the subsequent burst. Hence, the aperture module 306 receives the determined synchronization position for a current burst from the span adaptation module 305 and feeds resulting bounds for the next burst back to the span adaptation module 305.

It is noted that in connection with an EDGE receiver, it is preferred to combine the receiver filter with a noise whitening filter in order to suppress interferences and, thus, to avoid the necessity of a narrow receiver filter.

Figure 4:
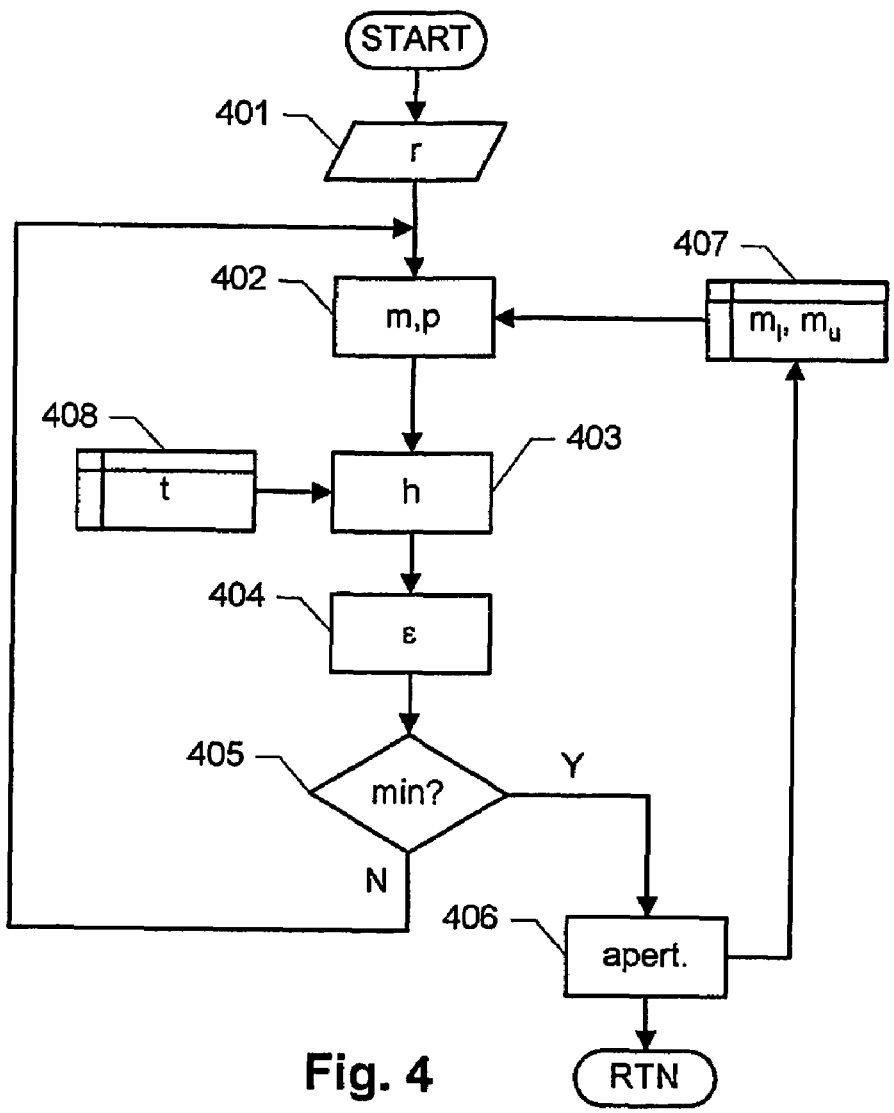
FIG. 4 is a flow diagram of burst synchronization and span adaptation according to an embodiment of the invention.

FIG. 4 is a flow diagram of burst synchronization and span adaptation according to an embodiment of the invention. Upon receipt of a signal burst r(k) in step 401, a Least Square Error algorithm is performed to determine the equalizer window span m and the synchronization position p as illustrated by the loop comprising steps 402-405.

According to this embodiment, the equalizer window span m and the synchronization position p are determined as $$(p, m)_{opt} = \operatorname*{argmin}_{p,m} (\varepsilon^2(p, m)) = \operatorname*{argmin}_{p,m} (\alpha^m \cdot e^2(p, m)), \quad (1)$$
$$p = 0, 1, \ldots, w-1$$
$$m = m_l, \ldots, m_u$$

where $\epsilon(p,m) = \alpha^{m/2} \cdot e(p,m)$ is a generalized error measure derived from the error function $$e(p, m) = \sqrt{\sum_k |r(k) - \hat{r}_{p,m}(k)|^2}.$$

Here $$\hat{r}_{p,m}(k) = \sum_{i=0}^{m-1} h_{p,m}(m-1-i) \cdot t(k+1)$$

is an estimate of the received signal expressed as a function of m and p, i.e. e(p,m) is a measure of the noise power introduced by the estimated transmission channel $h_{p,m}$ on the training sequence t.

If the noise power is used directly as an error function for optimization, the channel window size m tends to be larger than necessary. This is because the additional parameters of a larger filter could adjust themselves to particular features of the specific realization of the noise, i.e. the phenomenon sometimes referred to as overfitting. To avoid this, a penalty factor $\alpha^m$ is introduced according to the Minimum Description Length Principle (MDL) (see e.g. R. Johansson, "System Modeling and Identification", Prentice Hall, 1993). The penalty factor penalizes large equalizer spans m, and therefore suppresses the effect of overfitting. In a preferred embodiment, the factor $\alpha$ is determined by the length n of the training sequence $\alpha = n^{1/n}$. Hence, in the example of a 16-symbol training sequence $\alpha = 1.189$. It is noted, however, that alternatively other functions penalizing large window spans may be used.

The optimization of eqn. (1) is performed both for p and m, where m is varied in an interval between the upper and lower bounds $m_u$ and $m_l$, respectively, as will be described in greater detail below.

Still referring to FIG. 4, the optimization loop thus comprises the following steps:

Step 402: Select a pair of values (p,m) within the intervals indicated in eqn. (1).

Step 403: Estimate the transmission channel $h_{p,m}$ for the selected values of p and m based on the stored training sequence t (408). An efficient method of determining the channel estimate for a training sequence of the GSM system will be described in connection with FIG. 6.

Step 404: Calculate the generalized error $\epsilon^2(p,m)$. As will be shown in greater detail in connection with FIG. 6, for 16-symbol GSM training sequences and with m<8, the generalized error $\epsilon^2(p,m)$ may be expressed as $$\epsilon^2(p,m) = \alpha^m(|r|^2 - 16|h_{p,m}|^2), \epsilon^2 > 0.$$

Hence, in this case, the error measure $\epsilon^2(p,m)$ may be efficiently calculated as the difference of the received signal power $|r|^2$ and the scaled power of the estimated channel taps $16 \cdot |h_{p,m}|^2$, i.e. without the need for calculating the actual noise. It is noted, that the constraint $\epsilon^2 > 0$ is explicitly enforced, since the expression $|r|^2 - 16|h_{p,m}|^2$ may become negative at incorrect synchronization positions. Hence, when $16|h_{p,m}|^2 \geq |r|^2$ no further calculation is necessary and the hypothetical synchronization position is rejected immediately, since the constraint is not met.

Step 405: Repeat the above steps until a suitable minimum is found. In one embodiment, the error is calculated for all possible pairs (p,m) within the above intervals, and the minimum of all calculated values is determined as the optimal set of values $(p,m)_{opt}$.

When the optimal set of values $(p,m)_{opt}$ is determined, in step 406 the aperture for the span optimization of the subsequent burst, i.e. the upper and lower bounds $m_u$ and $m_l$, is determined and stored in a memory 407 for use in the subsequent optimization. According to this embodiment, an adaptive aperture is achieved by use of a simple auto regressive (AR) filter with one state $m_s$ that is updated at each burst:

$$m_s(t) = a \cdot m_s(t-1) + b \cdot m(t),$$

where m(t) is the current equalizer span determined by the above optimization. Hence, the state $m_s(t)$ corresponds to a weighted mean of the previously determined equalizer spans, where the spans determined for the most recent bursts are weighted strongest. A suitable initial value is assumed, e.g. $m_s(t=1) = m(t=1) = (m_{min} + m_{max})/2$. The relative weights are determined by the parameters a and b. Preferably a and b are selected in the interval [0,1], preferably such that a>b, e.g. $a \in [0.8, 0.9]$ and $b \in [0.1, 0.2]$, for example a=0.875 and b=0.125. Larger values of a reduce the relative influence of the most recent changes and vice versa, i.e. preferably the parameters a and b are selected according to the time scale of the variation in the delay spread.

The aperture of the equalizer span optimization is then determined as:

$$m_l = \text{round}(m_s(t-1)) - W_1, \quad m_l \geq m_{min}$$

$$m_u = \text{round}(m_s(t-1)) + W_2, \quad m_{max} \geq m_u,$$

i.e. $m_l$ and $m_u$ are lower and upper bounds, respectively, of an interval around $m_s$. The constants $W_1$ and $W_2$ determine the width of the aperture. For example, $W_1 = W_2 = 1$ yields an aperture that is 2-3 taps wide.

The constant upper and lower limits $m_{max}$ and $m_{min}$ ensure that $m_l$ and $m_u$ lie within desired limits, e.g. $m_{min} = 4$ corresponding to typical urban (TU), and $m_{max} = 8$ corresponding to hilly terrain (HT).

Figure 5:
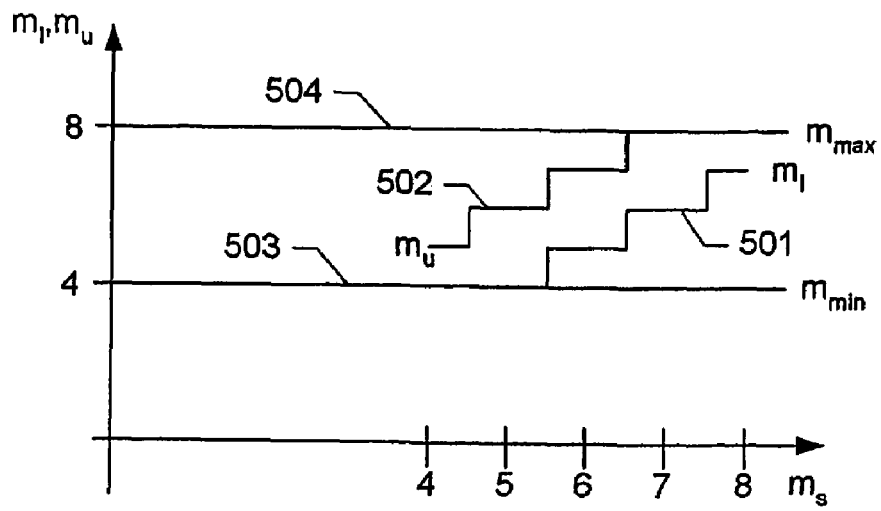
FIG. 5 illustrates the determination of the upper and lower bounds of a floating aperture for the equalizer span optimization.

FIG. 5 illustrates the determination of the upper and lower bounds of a floating aperture for the equalizer span optimization. Lines 501 and 502 illustrate the values $m_l$ and $m_u$, respectively, selected for different values of $m_s$ according to eqn. (3). Lines 503 and 504 illustrate an alternative constant choice of bounds.

Figure 6:
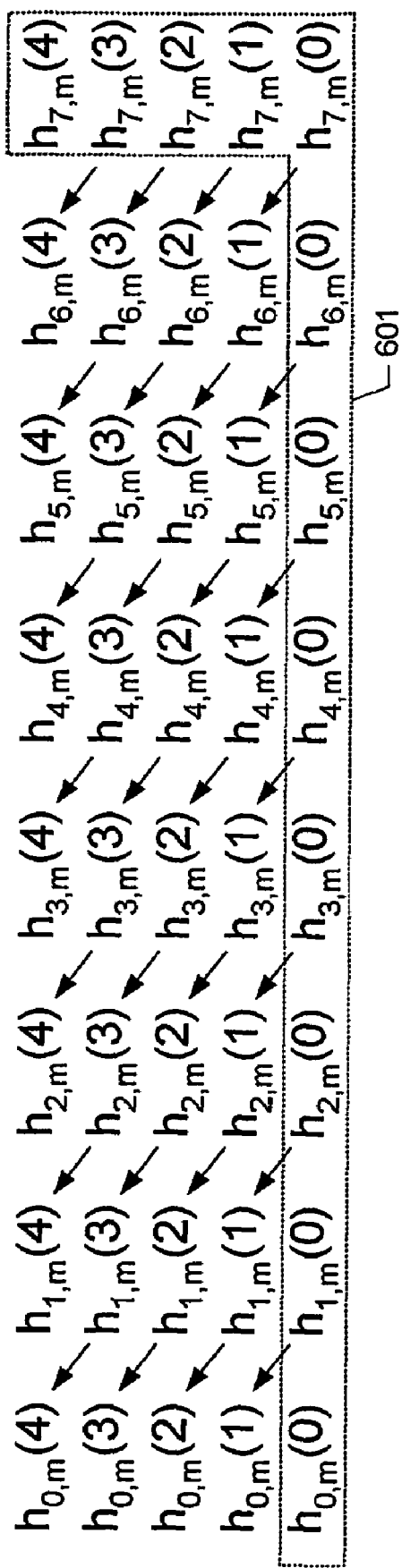
FIG. 6 illustrates a two-dimensional recursive relation for the calculation of channel taps according to an embodiment of the invention.

FIG. 6 illustrates a two-dimensional recursive relation for the calculation of channel taps according to an embodiment of the invention. The optimization method described in connection with FIG. 4 above requires that $w \times (m_u - m_l + 1)$ channel taps are estimated. In the following a computationally efficient channel estimation is described which exploits certain properties of the GSM/EDGE training sequences.

Hence, in the following a GSM/EDGE training sequence is considered:

$$t = [t_0 t_1 \ldots t_{m-1} \ldots t_{n-1}]^H.$$

For real training symbols, the Hermitian conjugate $[\ ]^H$ corresponds to simple matrix transposition.

For n>m, a channel estimation can be obtained by a LSE algorithm according to $$H = \Phi^{-1} T^H r,$$

where r is the vector of (n−m) received symbols, delayed by m−1 symbols, and $$\Phi = T^H T$$

is the autocorrelation matrix of dimension m×m the m×(n−m) dimensional Toeplitz-like matrix T of the training sequence:

$$T = \begin{bmatrix} t_{m-1} & t_m & \ldots & t_{n-1} \\ t_{m-2} & t_{m-1} & \ldots & \vdots \\ \vdots & \vdots & \ldots & \vdots \\ t_0 & t_1 & \ldots & t_{n-m} \end{bmatrix}.$$

In GSM/EDGE systems, 8 training sequences are specified for a normal burst. A transmission takes one of the sequences according to the so-called Training Sequence Code (see e.g. GSM 05.02, V8.0.0, ETSI, March 1999). Each training sequence consists of 26 symbols.

The GSM/EDGE training sequences have two properties, not previously exploited, which permit channel estimation to be carried out more efficiently. More particularly, the auto-correlation matrix of any consecutive 16-symbol segment of the GSM/EDGE training sequence is, within certain range, both shift invariant and order invariant.

Property I. Shift Invariant:

$$\Phi(m,d) = T^H(m,d)T(m,d) = 16 I_m, \quad (26-(16+m)) \geq d \geq 0,$$

where $\Phi(m,d)$ and $T(m,d)$ are written as functions of the number channel-taps m and the index d of the first training symbol in T, and where $I_m$ is the m-dimensional identity matrix.

Property II. Order Invariant:

$$\Phi(m,d) = T^H(m,d)T(m,d) = 16 I_m, \quad 7 \geq m \geq 1.$$

Property I is due to the cyclic prefix nature of the GSM/EDGE training sequences, in which the 26-bit training sequence is constructed by prepending the last 10 bits to its front.

This property enables a channel estimation to be carried out on delayed (shifted) training sequence segments. This flexible delay brings two important benefits:

(1) ISI corrupted leading symbols can be avoided in the computation; and
(2) the leading taps of a channel can be estimated using the same training sequence segments, regardless of the size of the equalizer window.

Property II enables channel estimation to be done for different equalizer windows ranging from 1 to 7 taps. Furthermore, it has been found that when m=8, four of the eight specified training sequence code (TSC) satisfy the above order invariants, and the auto-correlation matrix for the other four training sequences is in a specific sparse form:

$$\Phi(8, d) = \begin{bmatrix} 16 & 0 & \ldots & & \pm 4 \\ 0 & 16 & \ldots & & \\ \vdots & \vdots & \ddots & & \\ 0 & & & 16 & \\ \pm 4 & 0 & & & 16 \end{bmatrix}.$$

The inverse of $\Phi(8,d)$ has the same sparse, symmetric structure:

$$\Phi^{-1}(8, d) = \frac{1}{16} \begin{bmatrix} \alpha & 0 & \ldots & & \beta \\ 0 & 1 & \ldots & & \\ \vdots & \vdots & \ddots & & \\ 0 & & & 1 & \\ \beta & 0 & & & \alpha \end{bmatrix},$$

where $\alpha = 1.0667$, $\beta = \pm 0.2667$. This means that in the above estimation of 8-tap channels, only minor adjustments are necessary for certain TSCs:

$$\begin{bmatrix} h_0 \\ h_7 \end{bmatrix} = \begin{bmatrix} \alpha & \beta \\ \beta & \alpha \end{bmatrix} \begin{bmatrix} h_0 \\ h_7 \end{bmatrix}.$$

Property II indicates that not only a 5-tap channel, but all the 1-8 tap channels can be estimated efficiently without matrix inversion, if any consecutive 16-symbol segment of the training sequence is used. Utilization of these properties has a fundamental impact on the computational complexity of the channel estimation for different equalizer window sizes.

When an LSE approach is used for joint synchronization and equalizer window sizing, for a hypothetical sync position p and an equalizer window size m, by utilizing the properties discussed above, channel estimation can be computed as $$H=\Phi^{-1}T^H r=(1/16)T^H r.$$

With the exception of the constant factor, it can be further expressed in an explicit convolution form, $$h_{p,m}(k) = \sum_i t(m+i-k) \cdot r(p+m-i), \quad \begin{array}{l} 0 \leq p \leq w \\ 0 \leq k \leq m \end{array} \quad (4)$$

This can be considered as a FIR-style computation. For the next tap with k+1, a recurrent relation can be established:

$$h_{p,m}(k+1)=h_{p+1,m}(k)+t(m-1-k)\cdot r(p+m)-t(m+(n-1)-k)\cdot r(p+m+n). \quad (5)$$

Using this recursion in an IIR-style computation, a new tap can be calculated using only 4 real MAC operations (since the training sequences are real). This two-dimensional (sync-point tap-position) recursive relation can be depicted as shown in FIG. 6 for m=5, w=8. Computation of the last row and the last column (indicated by the area 601) is done by using equation (4), the rest can be recursively calculated using eqn. (5).

To avoid channel estimation error caused by ISI corrupted receiving training symbols, by property 1, a training sequence segment that is close to the end may be chosen. In practice, the last but one m+15 symbols of the training sequence are chosen in the estimation (the final symbol in the training sequence is not used, to avoid possible precursor ISI corruption).

As mentioned above, using the above properties, a simplified expression for the error measure $e^2$ may be achieved. To show this, the channel estimate $h_{p,m}$ and the corresponding prediction of the received signal may be written in matrix notation as follows:

$$h_{p,m}=(T^H T)^{-1}T^H r$$

$$\hat{r}=Th_{p,m}=T(T^H T)^{-1}T^H r.$$

Thus, the error $e^2$ can be written as $$e^2=(r-\hat{r})^2=r^H r-r^H T(T^H T)^{-1}T^H r.$$

Using the above relation $H=\Phi^{-1}T r=(1/16) T r$, this can be simplified as $$e^2=|r|^2-16|h_{p,m}|^2,$$

thereby yielding an efficient calculation of the squared error as a weighted energy difference of the 16-symbol received training sequence and the m-tap channel estimate, which can efficiently be calculated by the above described recursion.

The presented method has been put into simulation and verified. Simulations show that a significant performance gain is observed in long time dispersive channels with joint optimization compared to the correlation based synchronization. The joint synchronization and equalizer span adaptation significantly improves the performance of the equalizer in numerous channel conditions, i.e. in the range of 1-4 dB, with a comparable computational cost as the correlation based approach.

As mentioned above, the adaptive aperture in equalizer span adaptation further enhances the robustness of the joint optimization against colored interferences and device distortions. Correspondingly, a further improvement of more than 1 dB has been observed in simulations.

Figure 7:
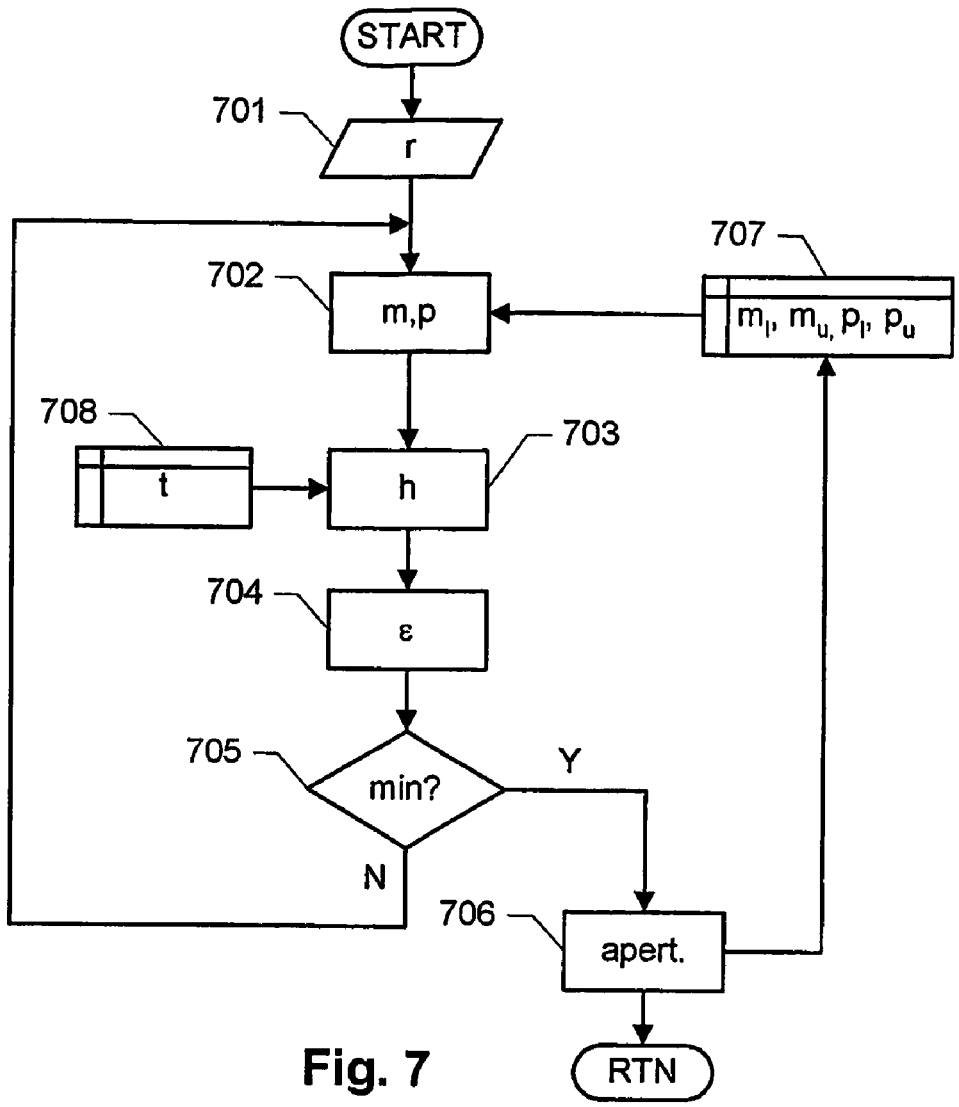
FIG. 7 is a flow diagram of burst synchronization and span adaptation according to another embodiment of the invention.

FIG. 7 is a flow diagram of burst synchronization and span adaptation according to another embodiment of the invention. The method comprises step 701 of receiving a signal burst r(k), and the method comprises the performance of a Least Square Error algorithm to determine the equalizer window span m and the synchronization position p as illustrated by the loop comprising steps 702-705.

According to this embodiment, the equalizer window span m and the synchronization position p are determined as $$(p,m)_{opt} = \underset{p,m}{\operatorname{argmin}}(\epsilon^2(p,m)) = \underset{p,m}{\operatorname{argmin}}(\alpha^m \cdot e^2(p,m)) \quad \begin{array}{l} p=p_l,\ldots,p_u \\ m=m_l,\ldots,m_u \end{array} \quad (6)$$

where $\epsilon(p,m)=\alpha^{m/2}\cdot e(p,m)$ is a generalized error measure derived from the error function $$e(p,m) = \sqrt{\sum_k |r(k)-\hat{r}_{p,m}(k)|^2}.$$

Here $$\hat{r}_{p,m}(k) = \sum_{i=0}^{m-1} h_{p,m}(m-1-i)\cdot t(k+1)$$

is an estimate of the received signal expressed as a function of m and p, i.e. e(p,m) is a measure of the noise power introduced by the estimated transmission channel $h_{p,m}$ on the training sequence t.

As described in connection with FIG. 4, a penalty factor $\alpha^m$ is introduced that penalizes large equalizer spans m, and therefore suppresses the effect of overfitting. In a preferred embodiment, the factor $\alpha$ is determined by the length n of the training sequence $\alpha=n^{1/n}$. Hence, in the example of a 16-symbol training sequence $\alpha=1.189$. It is noted, however, that alternatively other functions penalizing large window spans may be used.

The optimization of eqn. (6) is performed both for p and m, where m is varied in an interval between the upper and lower bounds $m_u$ and $m_l$, respectively, as was described in connection with FIGS. 4 and 5. Furthermore, according to this embodiment, p is varied in an interval between the upper and lower bounds $p_u$ and $p_l$, respectively.

Still referring to FIG. 7, the optimization loop thus comprises the following steps:

Step 702: Select a pair of values (p,m) within the intervals indicated in eqn. (6).

Step 703: Estimate the transmission channel $h_{p,m}$ for the selected values of p and m based on the stored training sequence t (708). An efficient method of determining the channel estimate for a training sequence of the GSM system has been described in connection with FIG. 6.

Step 704: Calculate the generalized error $\epsilon^2(p,m)$. It was described in connection with step 404 of FIG. 4, how the error measure $\epsilon^2(p,m)$ may be efficiently calculated for 16-symbol GSM training sequences and with m<8.

Step 705: Repeat the above steps until a suitable minimum is found. In one embodiment, the error is calculated for all possible pairs (p,m) within the above intervals, and the minimum of all calculated values is determined as the optimal set of values $(p,m)_{opt}$.

When the optimal set of values $(p,m)_{opt}$ is determined, in step 706 the aperture for the span optimization of the subsequent burst, i.e. the upper and lower bounds $m_u$ and $m_l$, is determined and stored in a memory 707 for use in the subsequent optimization, as was described in greater detail in connection with step 406 of FIG. 4. According to this embodiment, additionally an aperture for the optimization of the synchronization position of the subsequent burst, i.e. the upper and lower bounds $p_u$ and $p_l$, is determined and stored (707) for use in the subsequent optimization.

Similarly to the determination of $m_l$ and $m_u$, an adaptive aperture for the synchronization position is achieved by use of a simple auto regressive (AR) filter with one state $p_s$ that is updated at each burst:

$$p_s(t) = A \cdot p_s(t-1) + B \cdot p(t), \quad (7)$$

where p(t) is the current synchronization position determined by the above optimization. Hence, the state $p_s(t)$ corresponds to a weighted mean of the previously determined synchronization positions, where the positions determined for the most recent bursts are weighted strongest. A suitable initial value is assumed, e.g. $p_s(t=1)=p(t=1)=(p_{min}+p_{max})/2$. The relative weights are determined by the parameters A and B. Preferably A and B are selected in the interval [0,1], preferably such that A>B, e.g. A∈[0.8,0.9] and B∈[0.1,0.2], for example A=0.875 and B=0.125. Larger values of A reduce the relative influence of the most recent changes and vice versa, i.e. preferably the parameters A and B are selected according to the time scale of the variation in the synchronization position. It is noted that the parameters A and B may be selected to be different from or equal to the corresponding parameters a and b, respectively, used in the determination of the equalizer span aperture.

The aperture of the optimization of the synchronization position is then determined as:

$$p_l = \text{round}(p_s(t-1)) - w/2, \quad (8)$$

$$p_u = p_l + w,$$

i.e. $p_l$ and $p_u$ are lower and upper bounds, respectively, of an interval of width w around $p_s$. Hence, the synchronization position only needs to be determined within a narrow interval, e.g. having a width w of 3-5 symbols. It is noted that, in an alternative embodiment, a asymmetric interval around $p_s$ may be used instead. Furthermore, in one embodiment, the upper and lower bounds $p_u$ and $p_l$ may be restricted to lie between predetermined limits $P_{min}$ and $p_{max}$.

Hence, a simple auto-regressive filter is used to smooth the optimal position of the narrow window.

It is noted that, in an alternative embodiment, the floating aperture of the synchronization position may be applied in connection with a synchronization according to eqn. (0).

A floating aperture for synchronization window not only improves equalizer performance, but also reduces the computational complexity since, at each burst, fewer synchronization positions need to be tested.

Figure 8:
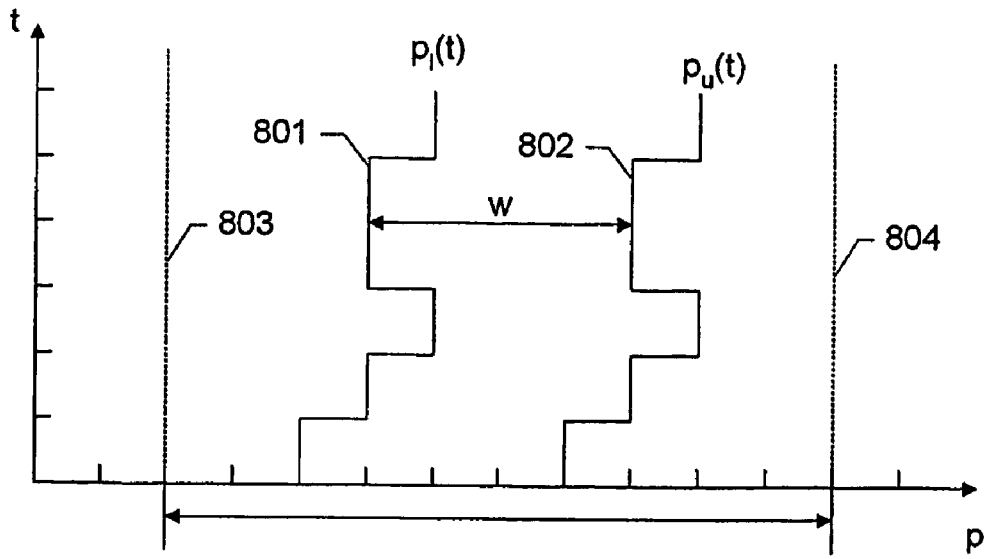
FIG. 8 illustrates the determination of the upper and lower bounds of a floating aperture for the synchronization position.

FIG. 8 illustrates the determination of the upper and lower bounds of a floating aperture for the synchronization position. Lines 801 and 802 illustrate the values $p_l$ and $p_u$, respectively, selected for bursts at different times t according to eqns. (7) and (8). Lines 803 and 804 illustrate an alternative constant choice of bounds.

The invention has primarily been described in connection with GSM/EDGE training symbols. However, the invention is not limited to GSM/EDGE, but may be applied to signal bursts of other communications schemes which utilize suitable training sequences for burst synchronization.

What is claimed is:

1. A method of estimating a transmission channel in a digital communications system including a receiver for receiving signal bursts of a communications signal via the transmission channel, the receiver comprising a channel estimation-based equalizer having an equalizer window, the method comprising:
    receiving a signal burst of the communications signal over the transmission channel, the signal burst including a sequence of training symbols;
    determining a desired synchronization position of the sequence of training symbols with respect to the received signal burst; wherein the step of determining a desired synchronization position further comprises
    determining a number of estimates of the transmission channel as a function of the synchronization position and a size of the equalizer window (m);
    determining a desired synchronization position and a desired size of the equalizer window by calculating an error measure based on the received signal burst and the determined estimates for a number of selected values of the synchronization position and of the size of the equalizer window, where the values of the size of the equalizer window are selected between predetermined upper (mu) and lower (ml) bounds.

2. The method according to claim 1, characterized in that the predetermined upper and lower bounds define an interval having a width which is less than four channel taps, preferably less than three channel taps.

3. The method according to claim 1, wherein the method further comprises determining the upper and lower bounds based on at least a desired size of the equalizer window as determined for a previously received signal burst.

4. The method according to claim 3, wherein the step of determining the upper and lower bounds further comprises:
    determining a reference window size by means of an auto regressive filter which is updated for at least a subset of received bursts based on the determined desired size of the equalizer window for each of at least the subset of received bursts; and
    selecting the upper and lower bounds to define an interval having a predetermined width around the determined reference window size.

5. The method according to claim 1, wherein the step of determining a desired synchronization position and a desired size of the equalizer window comprises calculating a difference between a calculated signal power of the received signal and a scaled power of a set of channel taps of the estimate of the transmission channel.

6. The method according to claim 5, wherein the method further comprises scaling the calculated difference with a penalty factor penalizing large equalizer windows.

7. The method according to claim 6, wherein the penalty factor comprises an exponential function of the equalizer span with a base determined by a length of the training sequence.

8. The method according to claim 1, wherein the communications signal comprises a signal in accordance with the GSM specifications.

9. The method according to claim 1, wherein the communications signal comprises a signal in accordance with the EDGE specifications.

10. The method according to claim 1, wherein the step of determining a number of estimates of the transmission channel comprises selecting a subset of the number of training symbols.

11. The method according to claim 1, wherein the step of determining a number of estimates of the transmission channel comprises determining channel taps of the estimate of the transmission channel for different synchronization positions and different sizes of the equalizer window by a two-dimensional recursive computation step.

12. The method according to claim 1, wherein the step of determining a desired synchronization position and a desired size of the equalizer window by calculating an error measure based on the received signal burst and the determined estimates for a number of selected values of the synchronization position and of the size of the equalizer window further comprises selecting the values of the size of the synchronization position between predetermined upper (Pu) and lower (Pl) bounds; and the method further comprises determining the upper and lower bounds for selecting the values of the size of the synchronization position based on at least a desired synchronization position determined for a previously received signal burst.

13. The method according to claim 12, wherein the step of determining the upper and lower bounds for selecting the values of the size of the synchronization position further comprises:
- determining a reference synchronization position by means of an auto regressive filter which is updated for at least a subset of received bursts based on the determined desired synchronization position for each of at least the subset of received bursts; and
- selecting the upper and lower bounds for selecting the values of the size of the synchronization position to define an interval having a predetermined width around the determined reference synchronization position.

14. An arrangement for estimating a transmission channel in a digital communications system including a receiver for receiving signal bursts of a communications signal via the transmission channel, the receiver comprising a channel estimation-based equalizer having an equalizer window, the arrangement comprising;
- means for receiving a signal burst of the communications signal over the transmission channel, the signal burst including a sequence of training symbols;
- means for determining a desired synchronization position (p) of the sequence of training symbols with respect to the received signal burst;
- wherein the means for determining a desired synchronization position is adapted to determine a number of estimates of the transmission channel as a function of the synchronization position and a size of the equalizer window (m); and to determine a desired synchronization position and a desired size of the equalizer window by calculating an error measure (e) based on the received signal burst and the determined estimates for a number of selected values of the synchronization position and of the size of the equalizer window, where the values of the size of the equalizer window are selected between predetermined upper (mu) and lower (ml) bounds.

15. A receiver for receiving signal bursts of a communications signal via a transmission channel in a digital communications system, the receiver comprising a channel estimation-based equalizer having an equalizer window and an arrangement for estimating the transmission channel, the arrangement comprising:
- means for receiving a signal burst of the communications signal over the transmission channel, the signal burst including a sequence of training symbols;
- means for determining a desired synchronization position (p) of the sequence of training symbols with respect to the received signal burst;
- wherein the means for determining a desired synchronization position is adapted to determine a number of estimates of the transmission channel as a function of the synchronization position and a size of the equalizer window (m): and to
- determine a desired synchronization position and a desired size of the equalizer window by calculating an error measure (e) based on the received signal burst and the determined estimates for a number of selected values of the synchronization position and of the size of the equalizer window, where the values of the size of the equalizer window are selected between predetermined upper (mu) and lower (ml) bounds.

* * * * *